(12) United States Patent
Mosher et al.

(10) Patent No.: US 6,257,175 B1
(45) Date of Patent: Jul. 10, 2001

(54) OXYGEN AND HYDROGEN GENERATOR APPARATUS FOR INTERNAL COMBUSTION ENGINES

(76) Inventors: Edward G. Mosher, 1641 W. Palm Cir., Bullhead City, AZ (US) 86442; John T. Webster, 1483 Lake Shore Dr., Branson, MO (US) 65616

( * ) Notice: Subject to any disclaimer, the term of this patent is extended or adjusted under 35 U.S.C. 154(b) by 0 days.

(21) Appl. No.: 09/310,166

(22) Filed: May 8, 1999

Related U.S. Application Data

(63) Continuation-in-part of application No. 08/929,375, filed on Sep. 15, 1997, now abandoned.

(51) Int. Cl.[7] ................................................. F02B 43/08
(52) U.S. Cl. .................................. 123/3; 123/DIG. 2
(58) Field of Search ........................... 123/3, DIG. 2

(56) References Cited

U.S. PATENT DOCUMENTS

| | | | |
|---|---|---|---|
| 5,143,025 | * | 9/1992 | Munday ................................. 123/3 |
| 5,305,715 | * | 4/1994 | Nissley ................................. 123/3 |
| 5,399,251 | * | 3/1995 | Nakamats ............................... 123/3 |
| 5,458,095 | * | 10/1995 | Post et al. ....................... 123/DIG. 12 |

* cited by examiner

Primary Examiner—John Kwon
(74) Attorney, Agent, or Firm—H. Gordon Shields

(57) ABSTRACT

Hydrogen and oxygen gases are generated for use in an internal combustion engine in a vehicle using the electrical system of the vehicle to provide current for the electrolysis process to generate the hydrogen and oxygen gases. The electrolysis process to eliminate oxygen and hydrogen gases occurs only while the engine is being operated and terminates when the engine stops. The hydrogen and oxygen gases are collected separately in the generator apparatus and flow separately in their own conduits to the intake manifold of the engine. Water in the generator apparatus is replenished from a reservoir as the water is used, and the water is accordingly kept at a desired level in the generator apparatus.

39 Claims, 11 Drawing Sheets

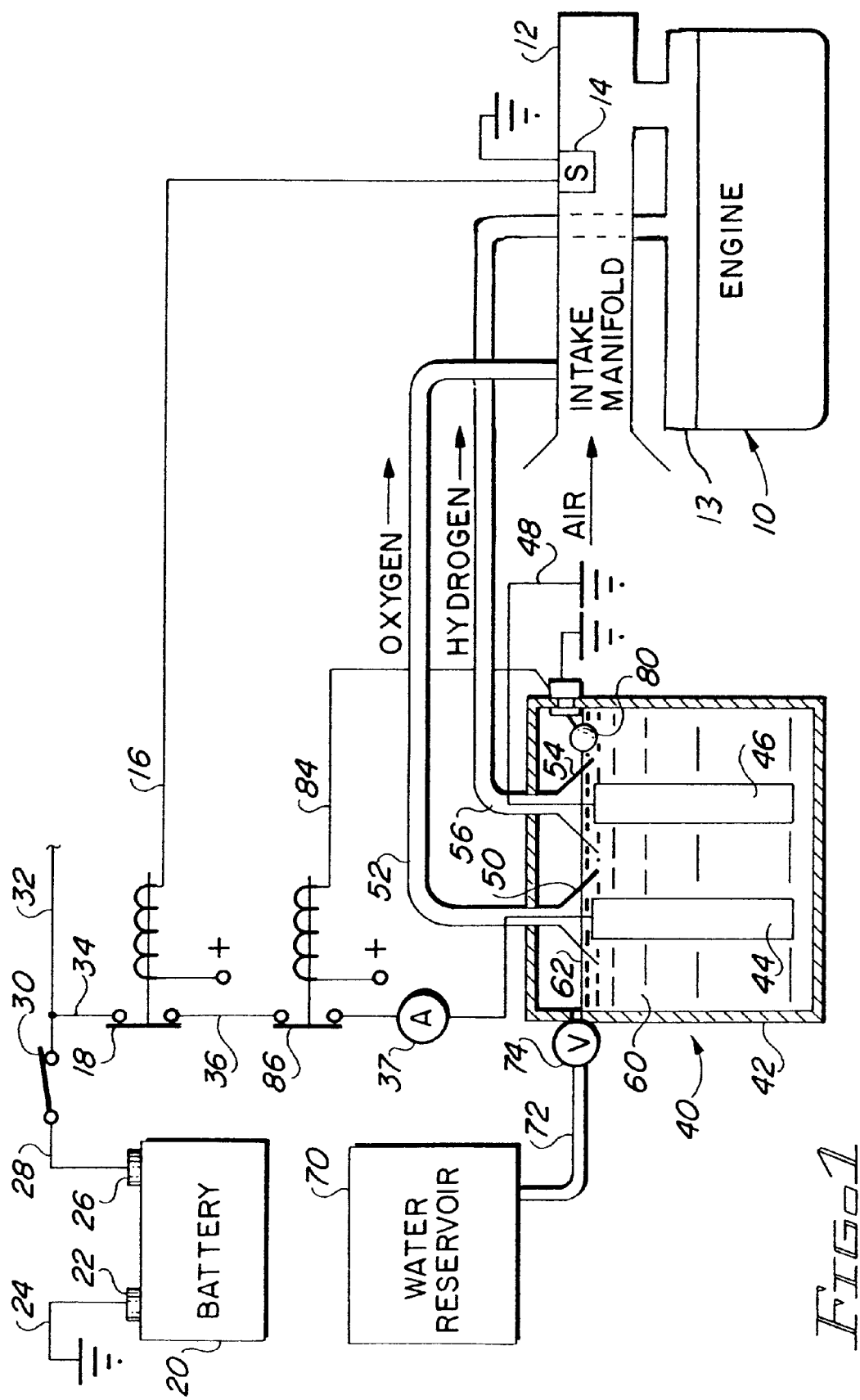

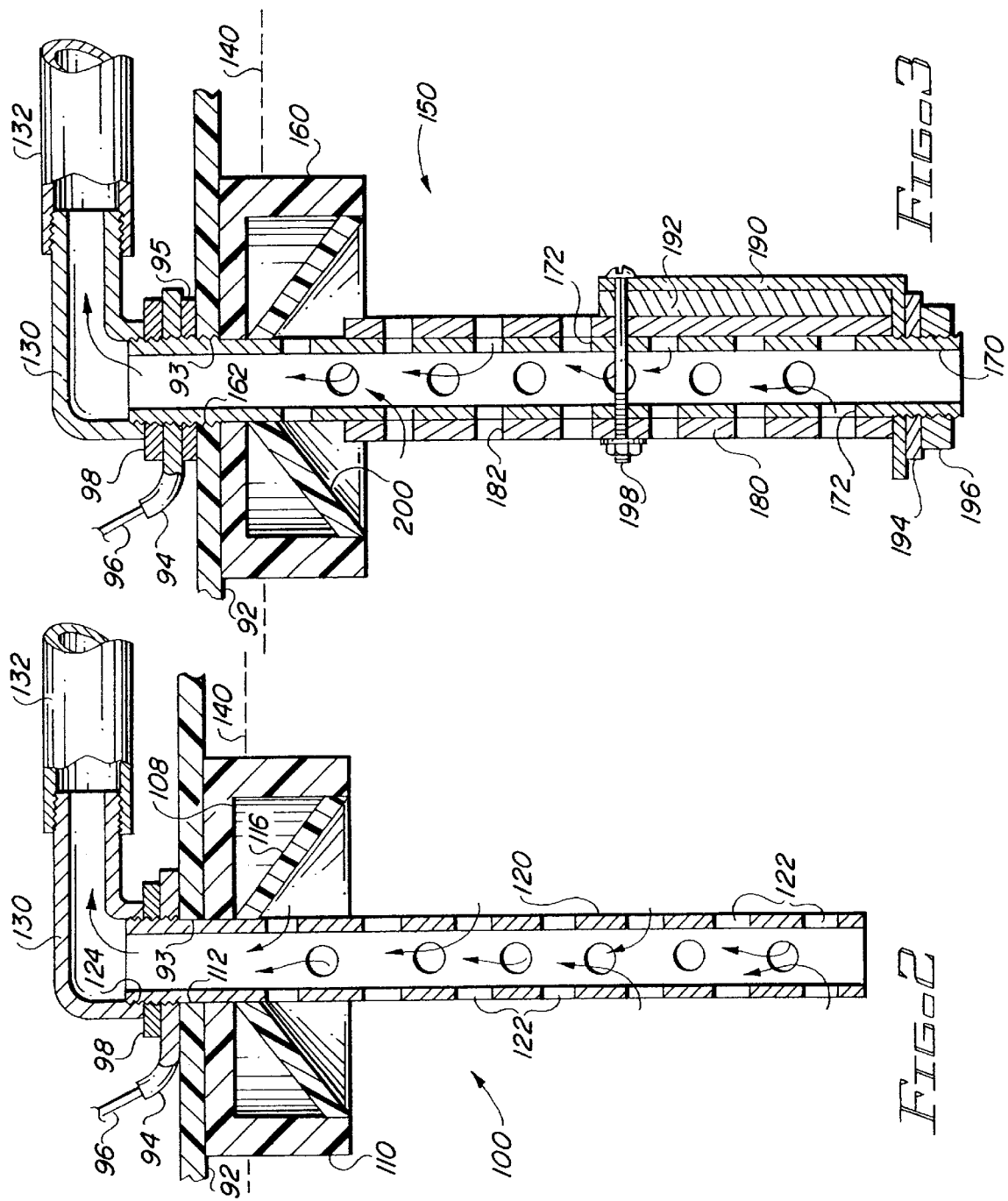

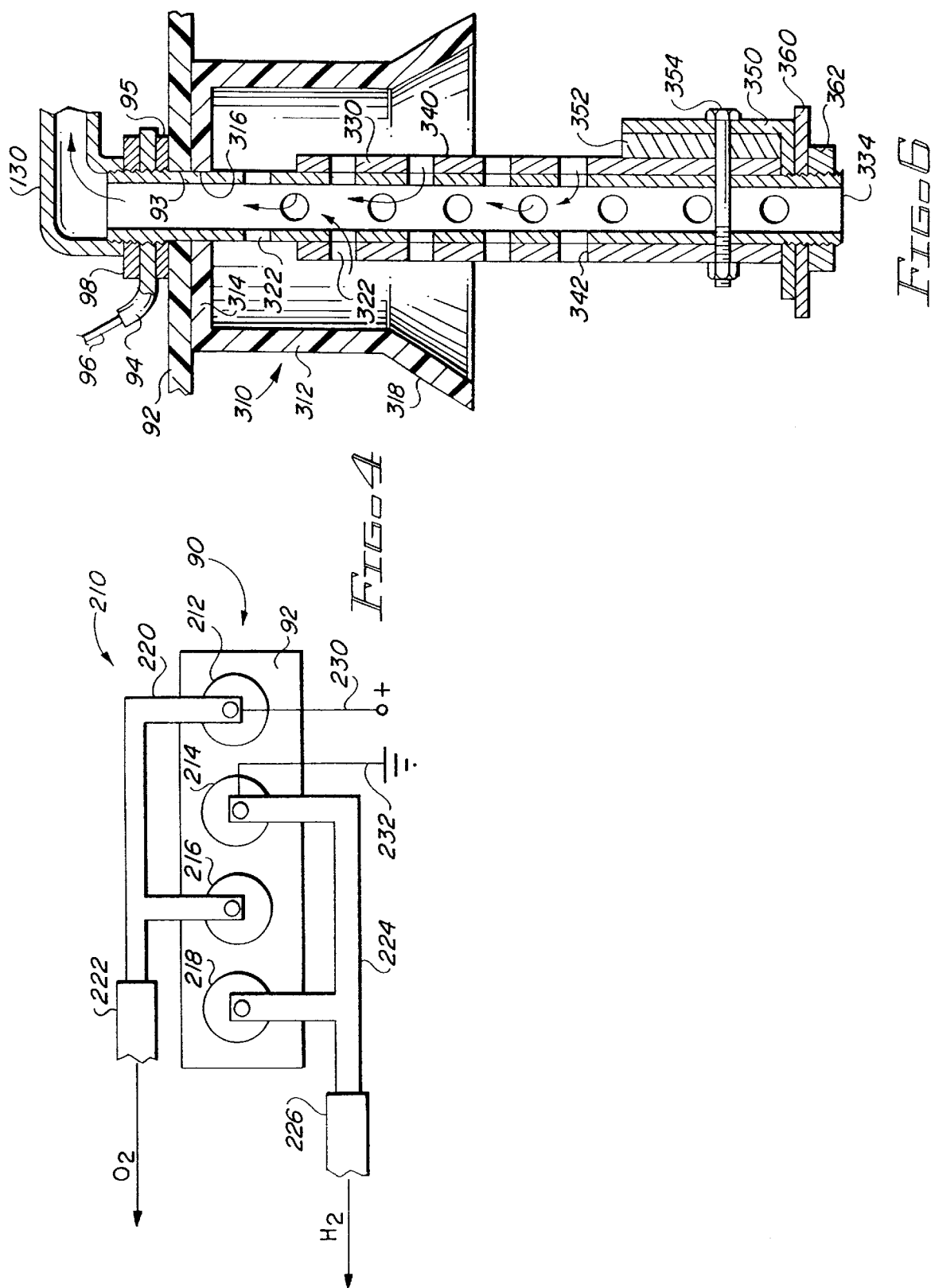

US 6,257,175 B1

OXYGEN AND HYDROGEN GENERATOR APPARATUS FOR INTERNAL COMBUSTION ENGINES

CROSS REFERENCE TO RELATED APPLICATION

This application is a Continuation In Part application of Ser. No. 08/929,375, filed Sep. 15, 1997, now abandoned.

BACKGROUND OF THE INVENTION

1. Field of the Invention

This invention relates to gas generator apparatus and, more particularly, to apparatus for generating hydrogen and oxygen gas for use in internal combustion engines.

2. Description of the Prior Art

It has long been known that the pollution caused by internal combustion engines can be decreased by the addition of oxygen. As a matter of fact, in recent years the oxygenating of fuel has been mandated in various states or areas as a means for decreasing pollution. At the same time, it has long been known that the burning of hydrogen provides a source of clean energy, since the combustion of hydrogen results in the formation of water as a by product. Hence, the use of an electrolysis unit to generate hydrogen and oxygen gases from water provides two important features, one of which is providing additional energy from the internal combustion engine and the other of which is decreasing pollution by the addition of oxygen in the combustion process.

However, it has also been recognized that there may be safety problems from generating hydrogen and oxygen gases. The apparatus of the present invention generates hydrogen and oxygen from an electrolysis unit and the gases are gathered separately in the unit and flow to the engine in separate conduits, thus maximizing the safety and at the same time providing the above discussed advantages of oxygen and hydrogen gases.

U.S. Pat. No. 4,023,545 (Mosher & Webster), the inventors of which are the inventors herein, describes apparatus for generating hydrogen and oxygen for an internal combustion engine. The hydrogen and oxygen gas is generated within a cell and flows through a conduit to the intake manifold of an internal combustion engine. An electrolysis, gas generating, unit is energized from the vehicle electrical system only when the ignition system is closed, and accordingly only when the engine is operating. Distilled water is used, with sodium hydroxide as the electrolyte. Water in the electrolysis unit is replenished from a reservoir. The electrolysis unit, as well as the anode and cathode elements, are made of appropriate metal, such as stainless steel, titanium, or other. The cathode electrode in the unit is electrically grounded to the vehicle chassis, and thus to the ground of the vehicle electrical system.

SUMMARY OF THE INVENTION

The invention described and claimed herein comprises an electrolysis unit which generates hydrogen gas and oxygen gas from water and an electrolyte, and which conveys the two gases separately to the intake manifold of an internal combustion engine. Different embodiments are illustrated. An electrolyte is used in the water to provide the appropriate current flow for the electrolysis process by which hydrogen and oxygen gases accumulate on the cathode and anode, respectively, electrodes. Electric current is provided by the electrical system of the vehicle in which the engine is disposed.

Among the objects of the present invention are the following:

To provide new and useful apparatus for generating hydrogen and oxygen for internal combustion engines;

To provide new and useful apparatus for collecting hydrogen and oxygen gases in an electrolysis unit;

To provide new and useful apparatus for generating hydrogen and oxygen in an electrolysis unit and for conveying the generated gases separately to the intake manifold of an internal combustion engine;

To provide new and useful apparatus for generating hydrogen and oxygen gases for an internal combustion engine using the electrical system of the engine;

To provide new and useful collector cells for collecting oxygen and hydrogen gases;

To provide new and useful apparatus for generating hydrogen and oxygen gases for internal combustion engine when the engine is running; and To provide new and useful apparatus for preventing the generation of hydrogen and oxygen gas in an electrolysis unit for an internal combustion engine when the engine is not running.

BRIEF DESCRIPTION OF THE DRAWING

FIG. 1 is a schematic representation of the present invention in its use environment.

FIG. 2 comprises a view in partial section through one embodiment of an element of the apparatus of the present invention.

FIG. 3 comprises a view in partial section of another embodiment of an element of the apparatus of the present invention.

FIG. 4 comprises a top schematic representation of one embodiment of the apparatus of the present invention.

FIG. 6 is a view in partial section of another embodiment of the present invention.

DESCRIPTION OF THE PREFERRED EMBODIMENT

Figure 5:
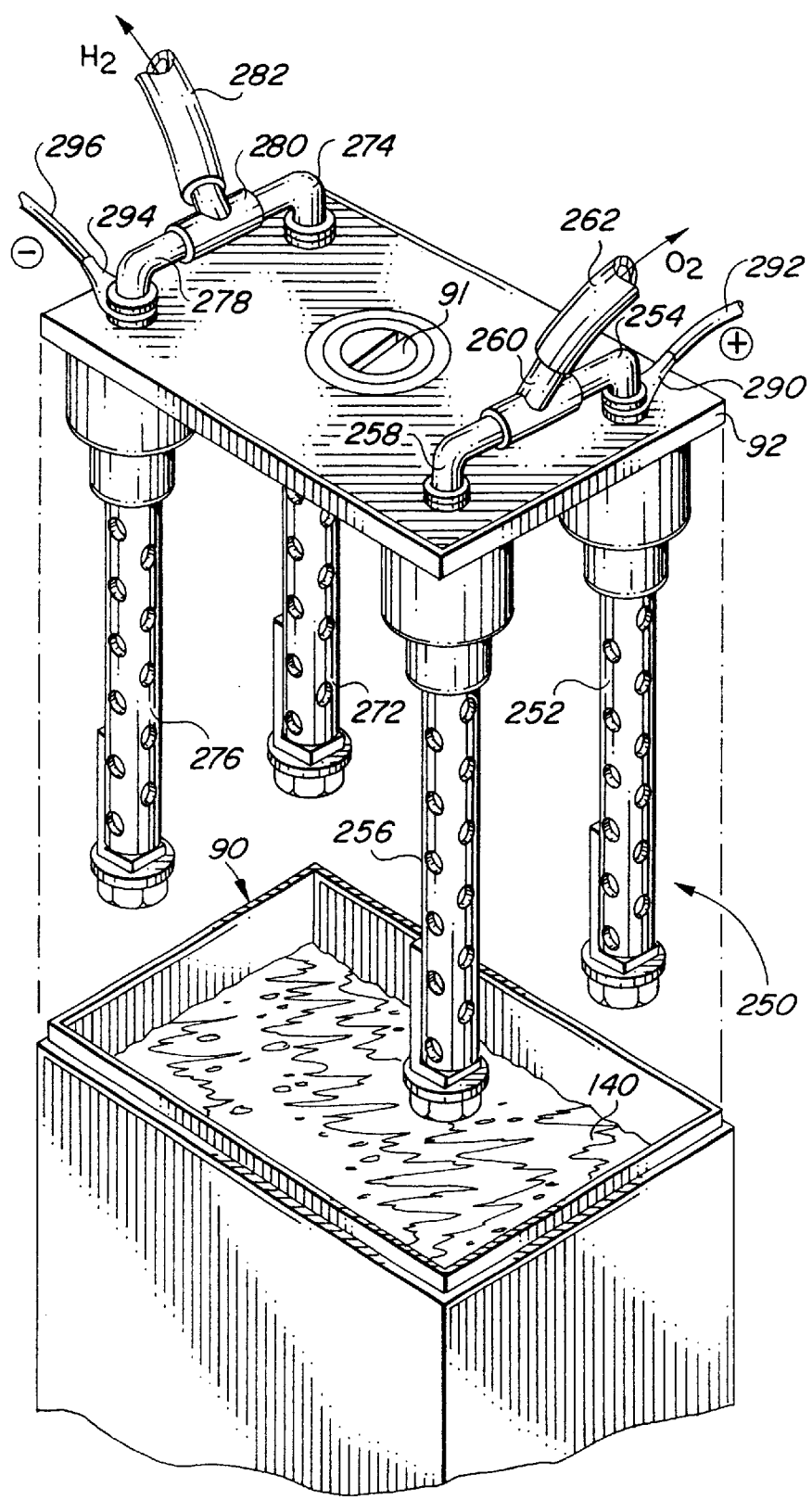
FIG. 5 is an exploded perspective view of another embodiment of the apparatus of the present invention.

FIG. 1 is a schematic representation of an engine 10 to which apparatus 40 of the present invention is operatively connected. Only the elements necessary for the understanding of the present invention will be discussed in conjunction with the engine 10.

The engine 10 includes an intake manifold 12. The intake manifold 12 provides air for the engine 10. An air flow or vacuum valve 14 is disposed in the intake manifold 12. The intake manifold 12 is also connected to hydrogen and oxygen generator apparatus 40 of the present invention. A fuel injection unit 13 is connected to the engine 10, and the intake manifold 12 is connected to the fuel injection unit 13.

A battery 20 provides electrical current for the hydrogen and oxygen generator apparatus 40 and for the engine 10, and its various accessories, not shown. The battery includes a negative or ground terminal 22 connected to a chassis ground of the vehicle in which the engine 10 is disposed by a conductor 24. The battery 20 also includes a positive terminal 26 to which is connected a conductor 28. The conductor 28 extends to one side of an ignition switch 30. Two conductors are shown connected to the other side of the ignition switch 30, including a conductor 32 to which are connected all of the various accessories commonly connected through a vehicle ignition switch. A conductor 34 is also connected to the ignition switch 30.

The conductor 34 extends to a solenoid switch 18. The switch 18 is in turn connected by a conductor 16 to the air flow or vacuum valve 14 in the intake manifold 12. A conductor 36 then extends from the solenoid 18 to an anode 44 disposed within a housing 40 of the hydrogen oxygen generator apparatus 40. A cathode 46 is also disposed within the housing 42 spaced apart from the anode 44. The cathode 46 is connected to vehicle ground through a conductor 48.

An ammeter 37 is disposed in the conductor 36. The ammeter indicates the current flowing in the electrical circuit for the electrolysis reaction which generates or liberates the oxygen and hydrogen gases at the anode and cathode electrodes, respectively. Such is well known and understood in the art.

An oxygen collector 50 is disposed about and above the anode 44. An oxygen conduit 52 extends from the collector 50 to the intake manifold 12. A hydrogen collector 54 is disposed above and about the cathode 46. A hydrogen conduit 56 extends from the collector 54 to the fuel injection unit 12. Thus, oxygen is introduced into the manifold 12, and is mixed with ordinary intake air, while the hydrogen is introduced directly into the fuel injection unit 13 ahead of the air and oxygen from the intake manifold 12. In actuality, the oxygen from the conduit 52 may be vented directly to the atmosphere instead of routed to the intake manifold, since there is sufficient oxygen in the atmosphere to sustain complete combustion in the engine 10 without the oxygen from the unit 40 and the conduit 52.

Within the housing 42 is a solution of water and electrolyte 60. The electrolyte may be sodium hydroxide or other appropriate chemical material. The level of the water and electrolyte solution is indicated by reference numeral 62. It will be noted that the level 62 is above the top of both the anode 44 and the cathode 46.

A water reservoir 70 is disposed adjacent to the housing 42. The reservoir 70 is connected to the housing 42 by a conduit 72. A valve 74 controls the flow of water from the reservoir 70 into the housing 42. The valve 74 may be a relatively simple float valve extending into the housing 42.

When a drop in the level 42 of the water and electrolyte 60 causes the float to move downwardly, the valve 74 is opened to allow water to flow from the reservoir 70 into the housing 42. When the water reaches the desired level, the float rises, closing the valve. Such valves are, of course, well known and understood.

A float switch 80 is included within the housing 42. The float switch is essentially a float valve but instead of controlling water flow, it controls current flow in a conductor 84. A float is connected to a switch in the conductor 84 and should the water level 62 drop below a predetermined level, the float drops and opens the circuit in the conductor 84.

The conductor 84 extends between a circuit ground and a current source at a solenoid 86. The solenoid 86 is normally closed in the conductor 36, in series with the solenoid 18, thus allowing current to flow to the hydrogen and oxygen generator apparatus 40.

Should the fluid (water and electrolyte) level in the housing 42 drop below the predetermined minimum, the float drops, opening the circuit and causing the solenoid 86 to open the circuit in the conductor 36. The apparatus 40 will accordingly stop generating hydrogen and oxygen.

There are at least three safety features involved with the generator apparatus 40 relative to the engine 10. The generator 40 will only operate to generate hydrogen and oxygen when the ignition switch 30 is closed. Moreover, the apparatus 40 will only operate as long as there is an air flow sensed through the intake manifold 12 by the air flow valve 14. Should the flow of air into the intake manifold 12 cease, indicating that the engine 10 is not operating, even though the ignition switch 30 is closed, the solenoid 18 will open, preventing the generator apparatus 40 from operating.

The third safety feature is the water level float switch 80, tied to the solenoid 86. When the water level drops below the predetermined level, the float drops, opening the circuit in conductor 84, causing the solenoid 86 to open, thus turning off the generator apparatus 40.

It will be noted that the oxygen and the hydrogen are collected separately in the generator apparatus 40, and the collected gases flow in separate conduits to the intake manifold 12 and to the fuel injection unit 13. The gases are not mixed together prior to their introduction to the fuel injection unit 13.

As is well known and understood, and as discussed above, oxygen may be introduced primarily to help the combustion processes within the engine 10 in order to reduce pollution from the exhaust of the engine 10. The hydrogen is added to provide extra energy from the combustion processes of the engine 10.

As indicated above, FIG. 1 comprises a schematic representation of hydrogen generator apparatus 40 of the present invention connected to an engine 10. Only a single anode 44 and a single cathode 46 are illustrated within the housing 42 of the apparatus 40. The anode 44 and its collector 50 represent a single oxygen generating cell for the apparatus 40, and the cathode 46 and its collector 54 represent a single hydrogen collecting cell for the generator apparatus 40. Multi-cell generator and collector units are desirable, and such are illustrated in conjunction with the other Figs. of the drawing, namely FIGS. 4, 5, and 7–9.

In the following discussed embodiments of hydrogen generating units, the hydrogen and oxygen gases are collected separately and are separately routed to an engine as discussed above.

FIG. 2 is a view in partial section of a generator unit usable in the apparatus of the present invention. That is, a plurality of generator cells 100, as illustrated in FIG. 2, may be employed in a housing, of which a portion of a top 92 is shown in FIG. 2. The housing to which the top 92 is illustrated may be similar to the housing 42 illustrated schematically in FIG. 1. That is, the housing may be a generally rectangular nonconductive housing, such as made of waterproof plastic, etc., with a bottom and four walls (not shown) extending between the top 92 and the bottom.

The top 92 may be appropriately sealed to the sides, with a filler hole, vents, etc., as are well known and understood in the art, all part of the top. The cell 100 is secured to the top 92 through an aperture 93 which extends through the top. This will be discussed in more detail below.

The generator cell 100 includes a cap 110. The cap 110 is preferably made of plastic material, which is, of course, nonconductive.

The top cap 110 includes a central aperture 112 through which extends a conductive pipe 120. The pipe 120 is preferably made of titanium, etc. A plurality of apertures 122 extend through the pipe 120. The apertures 122 allow the water and electrolyte solution to flow into the interior of the pipe.

The pipe 120 extends upwardly through the aperture 112 in the cap 110 and through the aperture 93 in the top wall 92. Above the wall 92, a terminal 94 is secured to the pipe 96 by a nut 98. A conductor 96 extends from the terminal 94 to either a source of positive current, if the pipe 120 is an anode for generating oxygen, or to an appropriate circuit ground if the pipe 120 is used as a cathode for generating hydrogen.

A connector 130 is also threadedly secured to the pipe 120 above the terminal 94 and the nut 98. A conduit 132 is in turn secured to the connector 130. Gas, hydrogen or oxygen, generated within the cell 100 flows upwardly in the pipe 120 and out the connector 130 and the conduit 132 to the intake manifold of an engine, such as the intake manifold 12 of the engine 10 illustrated in FIG. 1.

A generally conical collector element 116 is disposed about the pipe 120 adjacent to the cap 110 and at or above the uppermost aperture 122 in the pipe 120. The collector element 116 is also preferably a nonconductive element. The purpose of the collector 116 is to insure that the hydrogen or oxygen gas generated at the pipe electrode 120, which, is indicated above, may either be an anode electrode or a cathode electrode, flows into the pipe 120 and thus out of the unit 100.

The use of both the cap 110 and the conical collector element 116 help to insure the integrity of the generator cell 100. However, the cap 110 may be omitted if desired.

Gas generated within the pipe 120 will naturally flow upwardly within the pipe, and gas generated on the exterior of the pipe 120 will flow upwardly and will be guided through the uppermost apertures 122 by the conical collector 116.

The level of the water within the housing, and in which the cell 100 is disposed, is indicated by the dashed line 140.

FIG. 3 is a view in partial section through an alternate embodiment of the generator cell 100 of FIG. 2, comprising a generator cell 150.

The generator cell 150 is similar to generator cell 100 in that it includes a basic cap 160 and a pipe 170 secured to the top 92. An aperture 162 extends axially through the top cap 160.

The pipe 170 extends upwardly through the aperture 162 and the cap 160 and through the aperture 93 and the top wall 92. The pipe 170 also extends downwardly below the cap 160. Extending through the pipe 170 are apertures 172.

The upper portion of the pipe 170 is threaded to receive a nut or washer 95 which secures the pipe 170 and the cell 150 to the top wall 92.

A terminal 94 is secured to the pipe 170 between the bottom nut 95 and a top or upper nut 98. The conductor 96 extends outwardly from the terminal 94 to either a positive ground source or a negative ground, as desired for any generator cell 150, as discussed above for the cell 100.

Above the nut 98 the connector 130 is threadedly secured to the upper portion of the pipe 170. The conduit 132 is in turn secured to the connector 130. Disposed about the pipe 170 is a square tubing element 180. The square tubing element 180 includes a plurality of apertures 182 extending through it, and preferably aligned with the apertures 172 in the pipe 170. The square tubing element 180 has inside dimensions equal to the diameter of the pipe 170, and accordingly will be tangent to, and therefore touching, the pipe 170 in four places throughout the length of the pipe and the tubing.

The bottom of the pipe 170 is also threaded, and a bracket 196, having a generally L-shaped configuration, is secured to the bottom of the pipe 170 by a washer 194 and a nut 196. The bracket 190 holds a bar of zinc 192 against the square tubing 180. The bracket 190 secures the square tube 180 to the pipe 170, in addition to securing the zinc bar 192 to the tubing 180.

The vertical arm of the bracket 190 and the zinc bar 192 may be secured to the tubing 180 and the pipe 170 by an appropriate fastener, such as a bolt 198.

The bracket 190 is preferably made of titanium, etc., as are the washer 194 and the nut 196.

The purpose of the zinc bar is to improve the electrolysis process, and to slow the deterioration of the electrodes within the cells. As is well known and understood, zinc is typically used in watercraft for electrolysis purposes. The zinc has a direct effect of slowing the deterioration of the electrode subject to electrolysis reactions.

Preferably all of the metal elements of the collector cells are made of titanium, etc. except the marine zinc bar 192. The pipe 120 of the generator coil 100 of FIG. 2 is preferably made of titanium, etc., as is the pipe 170 of the cell 150, the square tubing 180, the bracket 190, and the washer 194 and nut 196, all of which are disposed below the water line 140. Externally, the metal elements may also be made of stainless steel, if desired.

At the upper portion of the pipe 170, and above the square tubing 170, and adjacent to the cap 160, is a conical collector element 200. The conical collector element 200 performs substantially the same function in the cell 150 as does the collector element 116 of the cell 100. That is, the collector element or canopy 200 insures that gas generated at the electrode, on the outside of the pipe 170 and the tubing 180, flows inwardly through the uppermost apertures 172 to the inside of the pipe 170.

It will be understood that the surface area of the pipe 170 with its square tubing 180, which essentially comprises a sleeve over the pipe 170, is substantially greater than that of the pipe 170 alone. Accordingly, for the same current density applied to the electrode, which consists of the pipe 170, the tubing 180, and the zinc bar 192 and the bracket 190, more gas will be generated than will be generated in the cell 100 by the pipe 120, alone and without a sleeve.

FIG. 4 comprises a top view schematic representation of hydrogen and oxygen generator apparatus 200 configured with four cells in an elongated rectangular configuration. The essential electrical elements are illustrated.

The apparatus 200 includes a housing 90, with four cells 212, 214, 216, and 218 appropriately secured to the top wall 92 of the housing 90. The cells 212, 214, 216, and 218 may be either the cells 100 of FIG. 2 or the cells 150 of FIG. 3, as desired, or any other configuration illustrated herein.

Cells 212 and 216 are shown connected together by a conductive manifold 220. The conductive manifold is simply metal connectors, such as the connector 130 illustrated in FIGS. 2 and 3, connected together by a metal fitting. Similarly, the cells 214 and 218 are connected together by a metallic or conductive manifold 224.

A flexible conduit 222 is connected to the manifold 220, while a flexible conduit 226 is connected to the manifold 224. Oxygen and hydrogen gases generated by the cells 212 and 216 and the cells 214 and 218 flow separately to an engine intake manifold in the conduits 222 and 226.

A conductor 230 is connected to the cell 212 and to the manifold 220 to provide electrical current for the cells 212 and 216. The conductor 230 is represented as being connected to a source of positive current.

A conductor 232, shown as a ground conductor, is connected to the cell 214 and to the manifold 224. Through the conductive manifold 224, the cell 218 is also connected to the conductor 232, just as the cell 216 is connected to the positive conductor 230 by the conductive manifold 220.

Thus, the electrodes within the cells 212 and 216 comprise anode electrodes, and accordingly oxygen will be generated within the cells 212 and 216 and will be conducted to the intake manifold of the engine through the manifold 220 and the conduit 222.

The electrodes within the cells 214 and 218 comprise cathode electrodes since they are connected to the negative or ground of the electrical system of the vehicle in which the apparatus 212 is disposed. Accordingly, hydrogen will be generated within the cells 214 and 218 and will be conducted to the intake manifold of the engine through the manifold 224 and the conduit 226.

A different configuration, but still a four cell gas generator, is shown in FIG. 5.

FIG. 5 is an exploded perspective view of an alternate embodiment 250 of the present invention, utilizing a rectangular pattern for a plurality of generator cells, as opposed to the in line pattern of the generator cells illustrated in FIG. 4 and discussed above. The gas generator apparatus 250 includes a housing 90 and its housing top wall 92 to which are secured four generator cells.

The housing 90, with its liquid, comprising water and an electrolyte, is shown beneath the housing top wall 92 and the four generator cells secured thereto. The liquid level 140 in the housing 90 is quite high, of necessity, as discussed above.

Secured to the housing top wall 92, and extending downwardly therefrom, are the four generator cells, including a cell pair 252 and 256, and a cell pair 272 and 276. The cells 252 and 256 are secured together by a tee fitting 260 secured to connectors 254 and 258. The connectors 254 and 258 are respectively connected to the cells 252 and 256. The securing of the connectors to the cells is substantially the same as shown in FIG. 3 with respect to the generator cell 150.

The tee 260, which is secured to both connectors 254 and 258, is of course, metal, to provide electrical connection between the electrodes within the cells 252 and 256. A conduit 262 in turn is secured to the tee 260, and gas generated in the cells 252 and 256 flows outwardly through the conduit 262.

A terminal connector 290 is shown connected to the cell 252 by the connector 254. A conductor 292 extends from the terminal connector 290. The "plus" sign adjacent to the conductor 292 indicates that a source of positive current is supplied to the electrodes within the cells 252 and 256, and accordingly oxygen is generated therein.

The cells 272 and 276 are similarly connected together by conductive connectors 274 and 298 and a conductive tee 280. The connectors 274 and 278 and the tee 280 are substantially identical to the connectors 254 and 258 and the tee 260.

A conduit 282 extends from the tee 280, and hydrogen gas generated in the cells 272 and 276 flows outwardly in the conduit 282. The gases generated by the cell pairs flow to the engine of the vehicle in which the apparatus 250 is disposed, substantially as shown in FIG. 1.

A terminal connector 294 is shown connected to the cell 176 and the connector 278. A conductor 296 in turn extends from the terminal 294. The "minus" sign by the conductor 296 indicates that the conductor 296 is grounded, and accordingly hydrogen gas is generated in the cells 272 and 276.

Extending through the top wall 92 is a fill port 91. The fill port 91 is used to fill the housing 90 with water and an electrolyte, as discussed above.

The cells 252, 256, 272 and 276 illustrated in FIG. 5 may be of the structural design of the cell 150 illustrated in FIG. 3, if desired. That is, a pipe with a square tube disposed about the pipe and a bar of marine zinc secured to the pipe may be included in the electrodes. A cap and a conical collector may be disposed at the juncture of an electrode and the housing top wall, as also discussed.

The rectangular configuration of the cell arrangement in the generator apparatus 250 may be used where there is more physical room than is available for the elongated rectangular configuration of generator apparatus 210 illustrated in FIG. 4.

In the generator apparatus 210 of FIG. 4, the negative and the positive electrodes alternate, while in the generator apparatus 250 of FIG. 5, the negative and positive electrodes are essentially ganged together in pairs and a pair is spaced apart from the adjacent and opposite polarity pair. Such a physical arrangement may have advantages under some circumstances. However, the specific design of a generator, as discussed above, may vary depending on the electrical capabilities of a vehicle and the quantity of oxygen and hydrogen gas desired for a particular engine.

FIG. 6 comprises a view in partial section of another generator cell embodiment comprising a generator cell 310. As with the generator cell embodiments 100 and 150 of FIGS. 2 and 3, respectively, the generator cell 310 is secured to the top wall 92, and the physical connector elements are those illustrated in FIG. 3.

The generator cell 310 includes an upper half cylinder 312 closed by atop wall 314. Extending through the top wall 314 is a central aperture 316. The top wall 314 is disposed adjacent to the top wall 92, in substantially the same manner as shown in FIG. 3.

At the bottom or lower end of the half cylinder 312 is an outwardly flaring skirt 318. The purpose of the skirt 318 is to make certain that any gas generated beneath the cylinder 312 and the skirt is trapped and flows upwardly within the cylinder 312 and then outwardly, as will be discussed.

The center electrode of the cell 310 comprises, again, a titanium, etc. pipe 330. The pipe 330 is threaded at its upper end and extends through the aperture 316 and the top wall 314 and through the aperture 93 in the top wall 92. Above the top wall 92 there is the washer or nut 95, the terminal 94, and the nut 98. Above the nut 98 is the connector 130. The connector 130 and the nut 95 threadedly engage the pipe 330.

Extending radially through the pipe 330 are apertures 332. The apertures 332 allow the electrolyte solution to flow freely into the pipe 330.

The pipe 330 includes an open bottom 334, and the lower portion of the pipe adjacent to the bottom 334, is appropriately threaded.

A square tubing sleeve 340 is appropriately secured to the pipe 330. Again, the square tubing 340 includes a plurality of apertures 342 which are aligned with the apertures 332 in the pipe 330 to allow for the free flow of the water and electrolyte solution.

An L-shaped bracket 350 is secured to the bottom of the pipe 330 and helps to secure a zinc block 352 to the square tubing 340. The vertical arm of the bracket 350 is disposed against the zinc block 352, and an appropriate fastener, such as a bolt 354, with its nut, secures the bracket 350 and the block 352 to the tubular sleeve 340 and also to the pipe 330.

The horizontal arm of the bracket 350 includes an aperture through which the bottom of the pipe 330 extends. Beneath the bracket 350 is a washer 360, and a nut 362 threadedly engages the lower threads of the pipe 340 to secure the washer 360 and the bracket 350 and the tubular sleeve 340 to the pipe 330. As before, all of the elements disposed in the water and electrolyte solution, except the zinc block 52, are preferably made of titanium, etc.

As mentioned above, the outwardly flaring skirt 318 insures that the gas bubbles generated on the electrode, which includes the pipe 330, the tubular sleeve 340, and the zinc block 352, etc., flows upwardly and inwardly through the apertures in the pipe, or in the sleeve and pipe, and upwardly in the pipe to be conveyed through the connector 130 and outwardly to the engine.

Once again, the generator 310 may be used as an anode if the conductor 96 is connected to a source of positive current, or may be a cathode electrode if the conductor 96 is grounded to a circuit ground.

Figure 7:
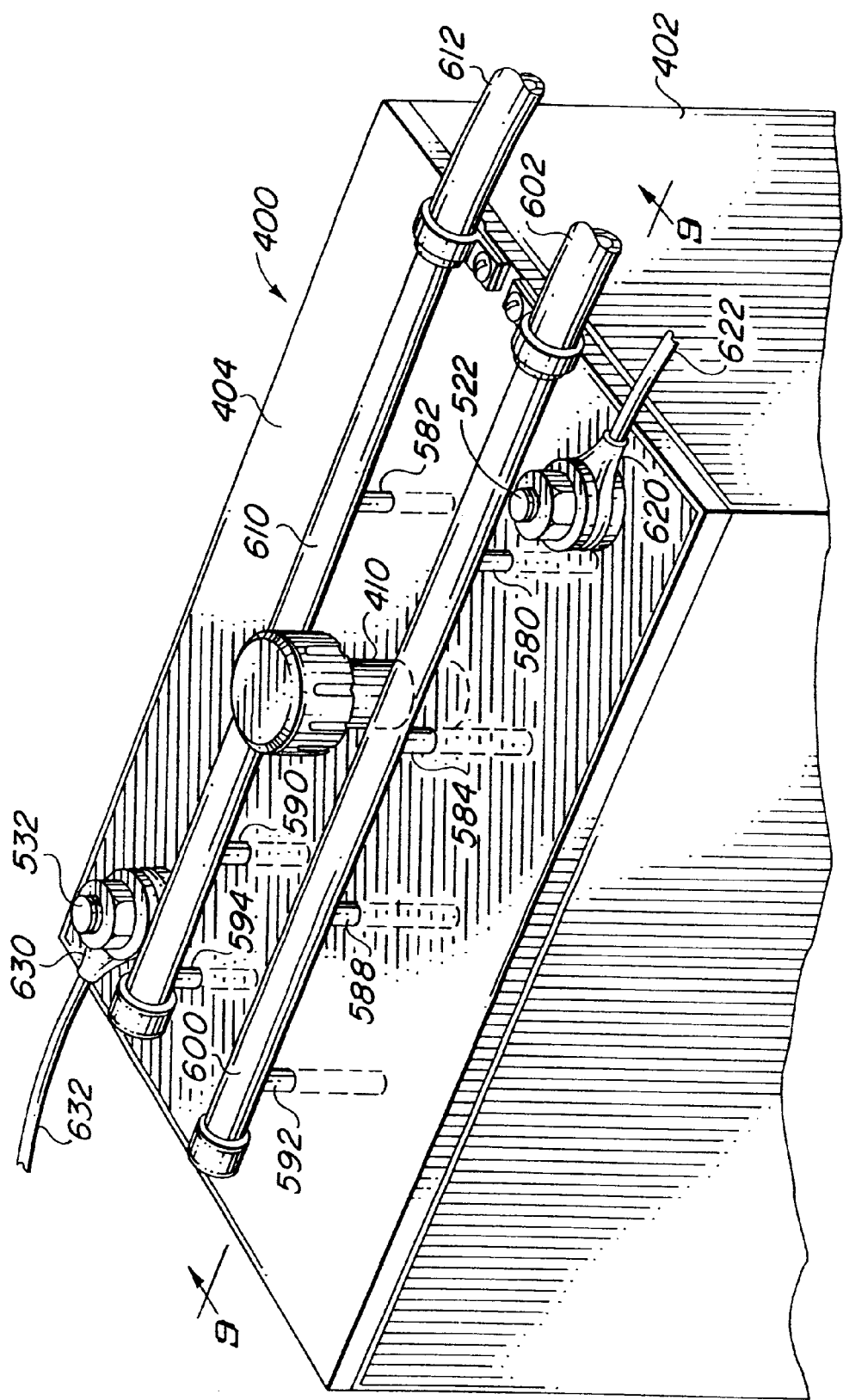
FIG. 7 is a perspective view of another embodiment of the apparatus of the present invention.
Figure 8:
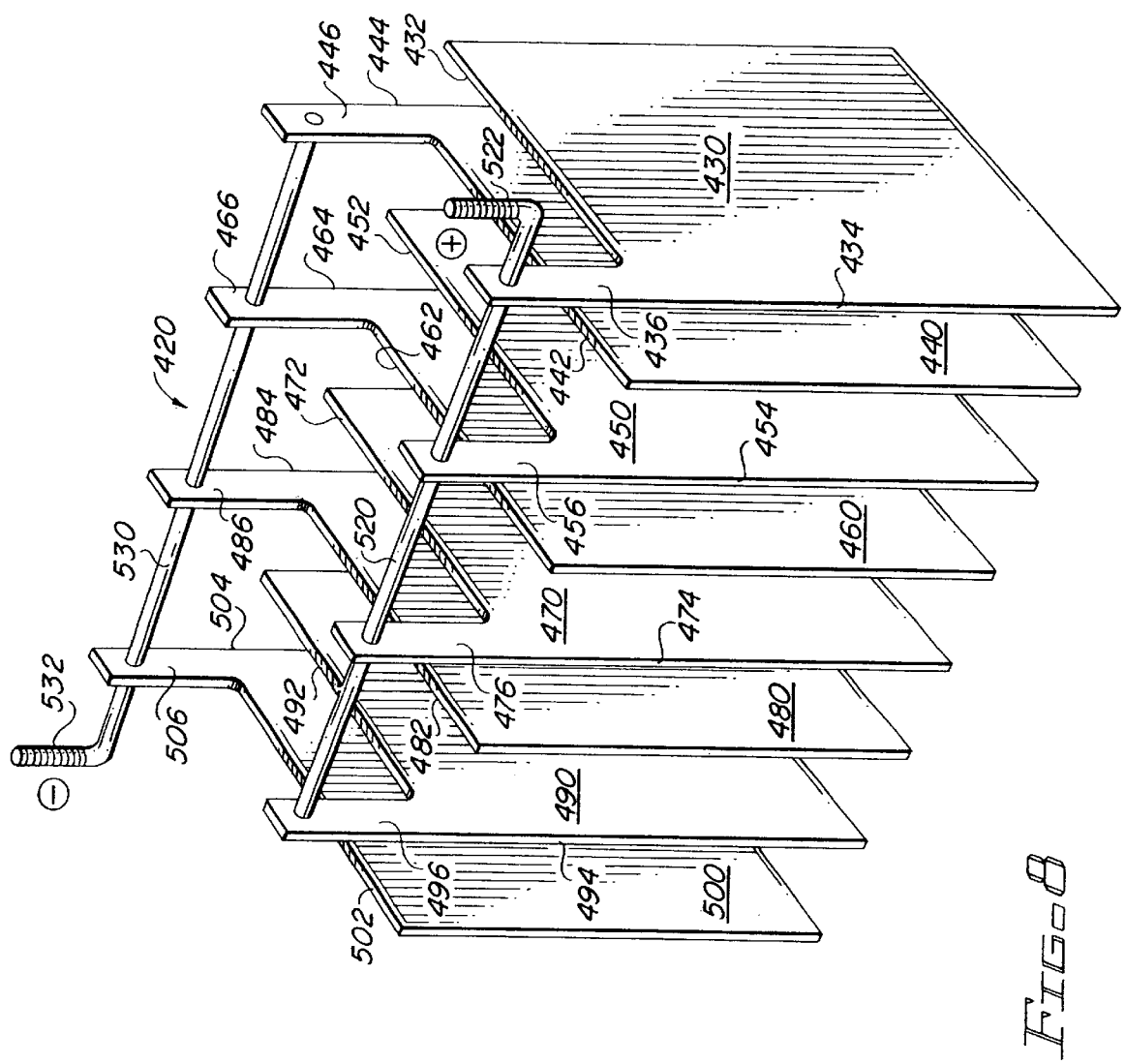
FIG. 8 is a perspective view of an alternate embodiment of a portion of the apparatus of the present invention.
Figure 9:
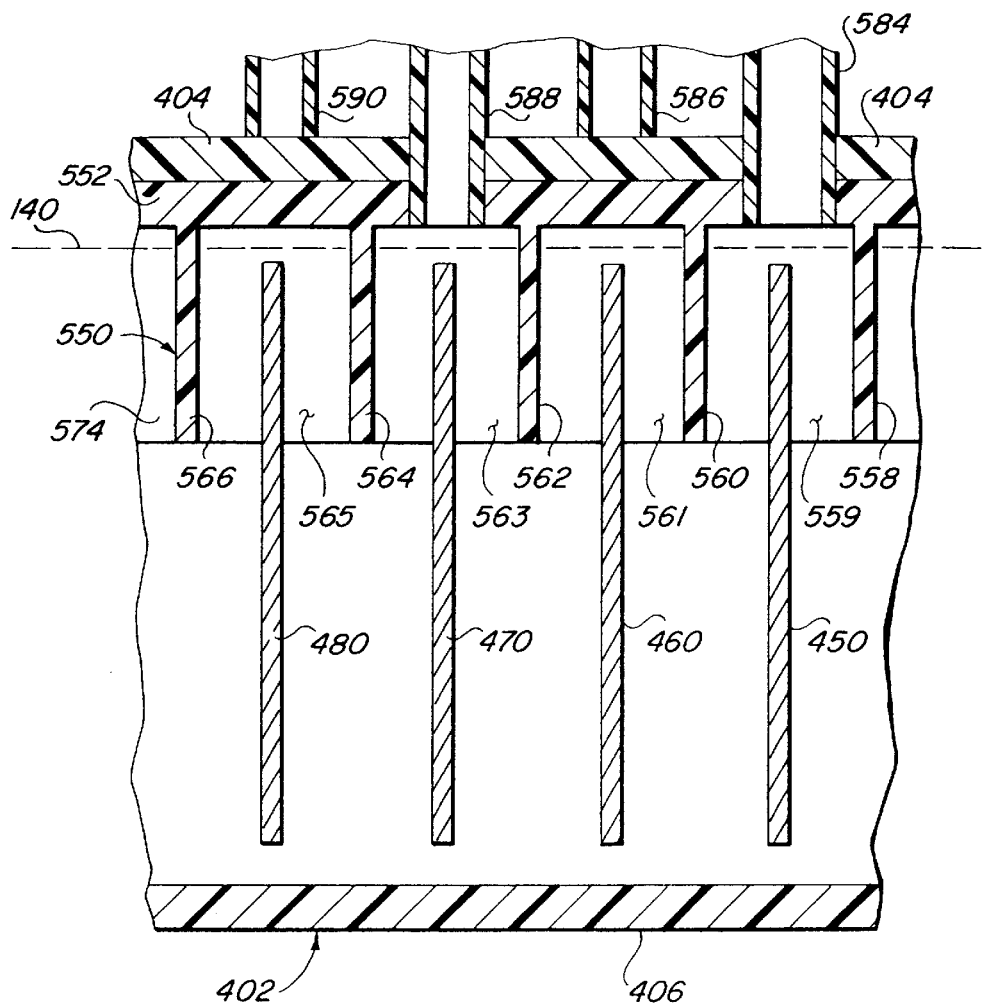
FIG. 9 is a view in partial section taken generally along line 9—9 of FIG. 7.

FIG. 7 is a perspective view of another alternate embodiment of the apparatus of the present invention, comprising oxygen and hydrogen generator apparatus 400. FIG. 8 comprises a perspective view of a plurality of plates and their electrical connections for the generator apparatus 400 of FIG. 7. FIG. 9 is a view in partial section taken generally along line 9—9 of FIG. 7, illustrating the compartmentalization for the electrode plates of FIG. 8 for the apparatus 400. For the following discussion, reference will primarily be made to FIGS. 7, 8, and 9.

Generator apparatus 400 includes a housing or casing 402 in which is disposed an electrode assembly 420, best shown in FIG. 8, and a collector assembly 550 disposed on top of the electrode assembly 420. Portions of the collector assembly 550 are shown in partial section in FIG. 9.

The housing or casing 402 is of a generally rectangular configuration, and includes an inner top wall 404 and a bottom wall 406 (see FIG. 9). The housing or casing 402 is, or course, made of nonconductive material, such as plastic.

The electrode assembly 420 is disposed in the housing 402. As shown in FIG. 8, eight plates are included in the electrode assembly 420. The plates are disposed above the bottom 406. The spacing between the bottom 406 and the bottom of the plates allows for sediment to collect without shorting out the plates.

It will be noted that the plates alternate in configuration. Each plate includes a top edge and an arm extending upwardly from the top edge at either the front edge or the back edge of each plate. The arms alternate to insure that electrical contact with adjacent plates through connector bars does not occur.

The plates includes a plate 430 which includes a top edge 432 and a front edge 434. The plate 430 also includes an upwardly extending arm 436. The arm 436 extends upwardly from the top edge 432 at the front edge 434.

Adjacent to the plate 430 is a plate 440. The plate 440 includes a top edge 442 and a rear edge 444. The plate 440 also includes a vertical arm 446 extending upwardly from the top edge 422 adjacent to the rear edge 444.

Adjacent to the plate 440 is a plate 450. The plate 450 is substantially identical to the plate 430. The plate 450 includes a top edge 452, a front edge 454, and an upwardly extending arm 456. The arm 456 extends upwardly from the front edge 472 adjacent to the front edge 454.

Adjacent to the plate 450 is a plate 460. The plate 460 is substantially identical to the plate 440. The plate 460 includes a top edge 462, a rear edge 464, and an upwardly extending arm 466. The arm 466 extends upwardly from the top edge 462 adjacent to the rear edge 464.

Adjacent to the plate 460 is a plate 470. The plate 470 includes a top edge 472, a front edge 474, and an upwardly extending arm 476. The arm 476 extends upwardly from the top edge 472 adjacent to the front edge 474.

The next plate in the electrode assembly is a plate 480. The plate 480 includes a top edge 482 and a rear edge 484. The plate 480 also includes an arm 486 extending upwardly from the top edge 482 adjacent to the rear edge 484.

The next plate in the array is a plate 490. The plate 490 includes a top edge 492, a front edge 494, and an upwardly extending arm 496. The arm 496 extends upwardly from the top edge 492 adjacent to the front edge 494.

The final, eighth, plate in the electrode assembly 420 is a plate 500. The plate 500 includes a top edge 502, a rear edge 504, and an upwardly extending arm 506. The arm 506 extends upwardly from the top edge 502 adjacent to the rear edge 504.

It will be seen that the plates 430, 450, 470, and 490 comprise a set and are substantially identical to each other, and the plates 440, 460, 480, and 500 comprise a set and are substantially identical to each other. The vertical arms of the sets are spaced apart from each other, as discussed above.

The two sets of plates define the electrodes for generating hydrogen and oxygen gas. The like plates of the sets are joined together at their vertical arms by an electrode connector bar. An electrode connector bar 520 is appropriately secured, as by welding, to the arms of the plates 430, 450, 470, and 490.

The electrode bar 520 includes a vertical arm or post portion 522 which extends upwardly through the collector assembly 550, as will be discussed below, and upwardly through the top wall 404 of the housing 402. The vertical portion 522 makes appropriate contact with the electrical system of the vehicle in which the generator apparatus 400 is disposed, as discussed above with the other embodiments.

A second electrode connector bar 530 is appropriately secured, again as by welding, to the arms of the plates 440, 460, 480, and 500. The connector bar 530 includes a vertical arm or post portion 532 which extends upwardly, ultimately through the top 404, for electrical connection to the vehicle's electric system.

The respective electrode connector bars are connected to the vertical arms of their respective electrode plates, and alternate past the top edges of adjacent, and alternating, electrode plates. This insures that inadvertent electrical contact between adjacent plates does not occur, as discussed above.

For collecting the generated gas, either oxygen or hydrogen, the collector assembly 550, shown in FIG. 9, is used, and the collector assembly 550 essentially turns each collector plate or electrode plate, into a separate gas generator cell. The collector assembly 550 includes a top plate 552, and a plurality of relatively short, but vertically extending walls depend from the top wall 552.

In FIG. 9, a rear wall 574 of the collector assembly 550 is shown. A front wall, not shown, and a pair of end walls, also not shown, extend downwardly from the top plate or wall 552 to form the outer perimeter of the collector assembly 550.

In addition to the four outer perimeter walls, there are a plurality of intermediate walls joined to the front and rear walls and to the top wall. Within the respective walls are collection chambers above the plates. In FIG. 9, intermediate walls 558, 560, 562, 564, and 566, are shown.

Between the walls 558 and 560, and downwardly from the top wall 552, and between the front wall (not shown) and the rear wall 574, is a collection chamber 559. A collection chamber 561 is defined between the front and rear walls and the intermediate walls 560 and 562. A collection chamber 563 is similarly shown between the walls 562 and 564, the rear wall 574, and the front wall. A fourth collection chamber 565 is shown between the walls 564 and 566, the rear wall 574, and the front wall.

The upper portion of the respective electrode plates extend into the collection chambers. The upper portion of the plate 450 extends into the collection chamber 559. The plate 460 extends into the collection chamber 561, the plate 470 extends into the collection chamber 563, and the plate 480 is shown extending into the collection chamber 565.

Each collection chamber is disposed at the upper portion of a collector cell. Each collector cell includes a collector cell conduit which extend upwardly from the top wall 552 of the collector assembly 550, and through the top plate 404 of the housing 402. The collector cell conduits include the conduits 584, 586, 588, and 590, shown in FIGS. 7 and 9, and also conduits 580, 582, 592, and 594, shown in FIG. 7. (Conduit 586 is not shown in FIG. 7, but is shown in FIG. 9).

The conduits 580, 584, 588, and 592 extend to a collector header 600, and a conduit 602 is secured to the header 600. The conduit 602 extends to an engine's intake manifold. The conduits 582, 586, 590, and 594 extend to a collection header 610, and a conduit 612 is secured to the header 610. The conduit 612 extends from the header 610 to the intake manifold of the engine. As may be understood from FIGS. 7 and 8, the terminal 620 is secured to the vertical arm or post 522. A conductor 622 is in turn connected to the terminal 620. A similar terminal 630 is secured to the vertical arm or post 532, and a conductor 632 is secured to the terminal 630. The conductor 622 and 632 extend to the appropriate electrical element, one of them, as desired, to a source of positive current and the other to an appropriate circuit ground.

Figure 10:
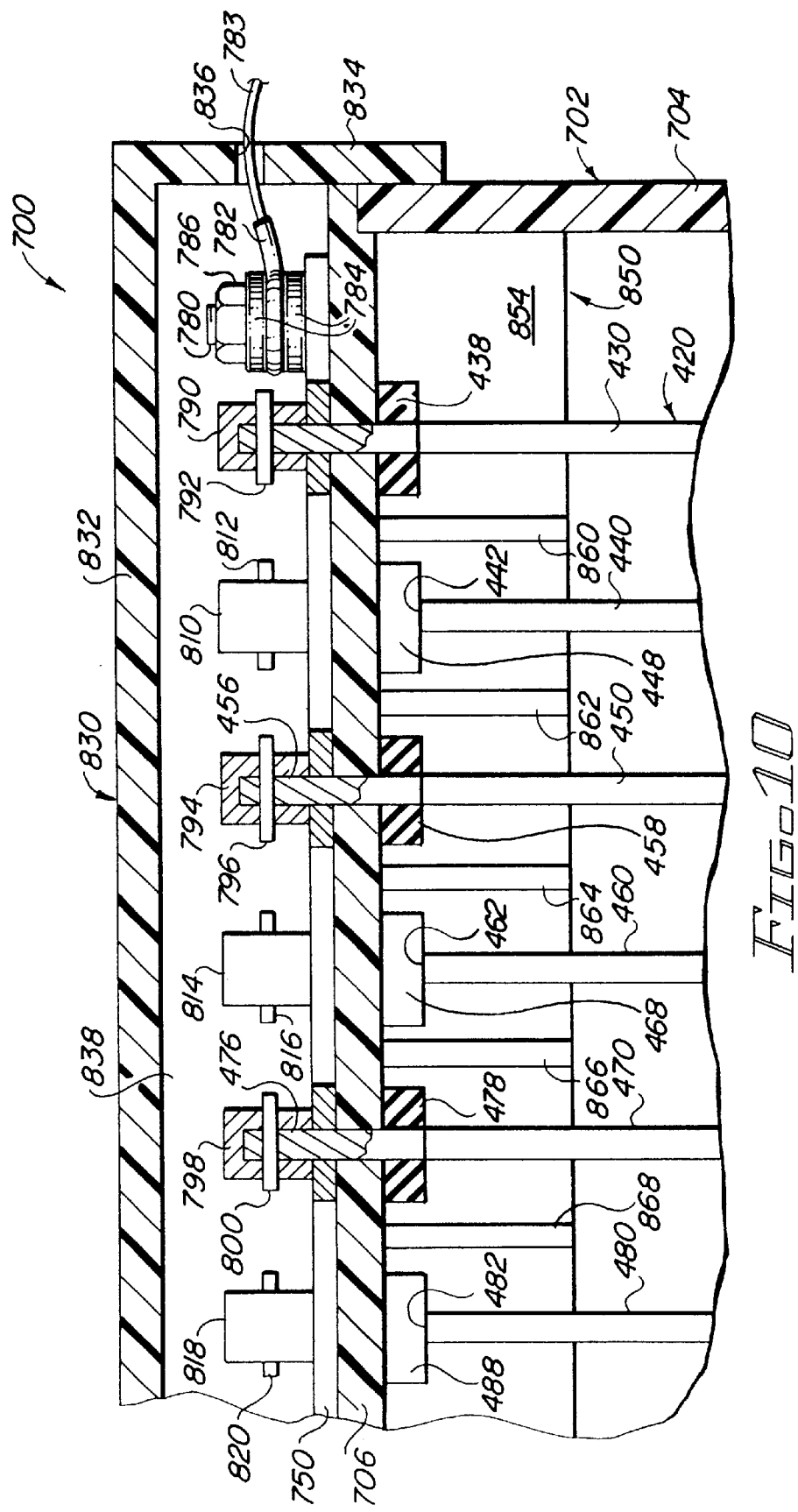
FIG. 10 is a view in partial section of another alternate embodiment of the apparatus of the present invention.

Water level 140 is indicated by the dashed line 140 in FIG. 10. It will be noted that the water level 140 is above the top of the electrode plates within the housing 402.

The various elements for maintaining the water level at the desired height within the housing 402 is, of course, well known and understood, and is explained generally in conjunction with FIG. 1. Such has been omitted from FIG. 7 and also from FIG. 5. However, a fill port 410 is shown on the top 404 in FIG. 7.

The oxygen and hydrogen generator apparatus 410 will, of course, provide more hydrogen and oxygen than will the other embodiments disclosed and discussed herein. The apparatus may be scaled up or down, as required for a particular vehicle application.

FIG. 10 is a fragmentary front view in partial section of another embodiment apparatus 700 of the present invention. The apparatus 700 uses the electrode assembly 420 discussed above with slight variations, primarily in the electrical connector elements. In FIG. 10, six plates 430, 440, 450, 460, 470, and 480 are shown. The plate array 420 is disposed within a housing 702. For purposes of the present invention, the housing 702 includes an end wall 704 and a top wall 706. Extending through the top wall 706 are slots which receive the arms of the plates. Thus, a slot 708 receives the upwardly extending arm 436 of the plate 430, a slot 712 receives the upwardly extending arm 456 of the plate 450, and a slot 17 receives the upwardly extending arm 476 of the plate 470. There are also slots, not shown, which receive the upwardly extending arms 446, 466, and 486 of the plates 440, 460, and 480, respectively.

Gaskets or washers, made of an appropriate material, such as neoprene rubber, provide a seal between the plates and the top wall 706. The gasket seals include slots through which the arms of the plates extend. The gasket seals are held against the bottom surface of the top plate 706 by the top edges of the plates.

The gasket seals shown in FIG. 10 include a gasket 438 disposed on the arm of the plate 430, a gasket 448 disposed on the arm of the plate 440, a gasket 458 disposed on the arm of the plate 450, a gasket 468 disposed on the arm of the plate 460, a gasket 478 disposed on the arm of the plate 470, and a gasket 488 disposed on the arm of the plate 480.

The gaskets 448, 468, and 488 are shown disposed on the top edges 442, 462, and 482, respectively, of their plates. The gaskets help to prevent any generated gas from leaking upwardly past the vertical arms and help to prevent any moisture, water and electrolytes, from also leaking upwardly. Thus, the plates and water and electrolyte are essentially sealed in the housing. Only the upper portion of the vertical arms of the plates extend above the top plate 706 for electrical contact purposes. The gases generated on the plates are isolated, as discussed above, and are collected separately, as also discussed above.

Figure 11:
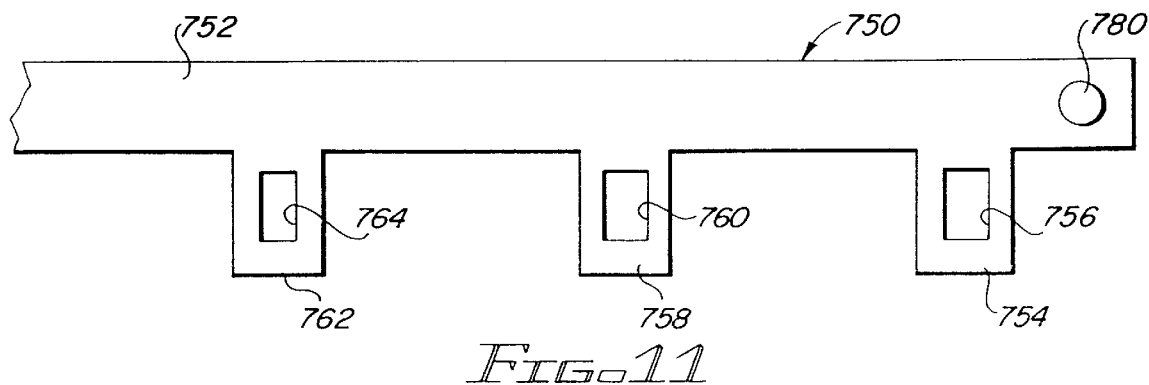
FIG. 11 is a top plan view of a portion of the apparatus of FIG. 10.

Disposed on the top 706 is a conductive element 750. The conductive element 750 is shown fragmentarily in plan view in FIG. 11. FIG. 11 comprises a top, plan view of the element 750, or a portion thereof, which is associated with the plates 430, 450, and 470 illustrated in FIG. 10. For the following discussion of the conductive element 750, attention will be directed to both FIG. 11 and FIG. 10.

The conductive element 750 is preferably stamped out of copper, or the like, and is disposed on the top 706, as discussed above.

The conductive element 750 includes a strip 752. A plurality of arms or ears extend outwardly from the strip 752. A slot extends through each arm or ear. The slots receive the upwardly extending arms of the respective plates. Thus, arms 754, 758, and 762 include, respectively, slot 756, 760, and 764. The arm 436 extends through the slot 756, the arm 456 extends through the slot 760, and the arm 476 extends through the slot 764.

The slots 756, 760, 764, etc., are dimensioned so as to be substantially the same size as the dimensions of the upwardly extending arms to help provide a good electrical contact between the arms and the element 750.

Extending upwardly from one end of the strip 752 is a post 780. The post 780 is threaded at its upper portion to receive a nut 786. As shown in FIG. 10, an electrical connector 782, with its conductor 783, is appropriately secured to the post 780 between a pair of washer elements 784. The nut 786 secures the washer 784 and the connector 782 to the post 780.

Attention will now be directed primarily to FIG. 10 again. To insure good electrical contact between the arms 436, 456, and 476, etc., with the conductive strip 750, caps and pins are used. In FIG. 8, it will be understood that the upwardly extending arms each have holes or apertures extending through them for receiving the rods 520 and 530, as appropriate. In the embodiment of FIGS. 10 and 11, pins extend through the holes in the arms to secure the caps to the arms. The caps extend downwardly and bear against the ears of the conductive element 750.

The upper portion of the arm 436 of the plate 430 is covered by a cap 790. A pin 792 extends through both the cap 790 and the arm 436. A similar cap 794 with its pin 796 is disposed on the top of and secured to the arm 456 of the plate 450. A cap 798 is shown disposed on the upper portion of the arm 476 of the plate 470, and a pin 800 extends through both the cap 798 and the arm 476.

Caps and pins are also shown associated with the arms 446, 466, and 486. The arm 446 is shown with a cap 810 disposed thereon, and a pin 812 extends through both of them. A cap 814 and a pin 816 are shown in conjunction with the arm 466 of the plate 460. Finally, a cap 818 with its pin 820 are shown in conjunction with the arm 486 of the plate 480.

The connector 782 is disposed between a pair of washers 784 on the post 780 and is held thereon by a nut 786.

Also shown in FIG. 10 is a non-conductive top cover 830 which encloses the electrical elements and also the gas manifolds, not shown in FIG. 10, to thus provide a degree of protection for the entire apparatus 700. The cover 830 includes, as illustrated in FIG. 10, a top wall 832, an end wall 834, and a side wall 838. The cover is appropriately secured to the housing 702. An aperture in the end wall 836 receives the conductor 783. Other apertures extending through the walls of the cover 830 receive the two conduits for the gases generated in the apparatus 700 and also a second conductor for the electrical system.

Figure 12:
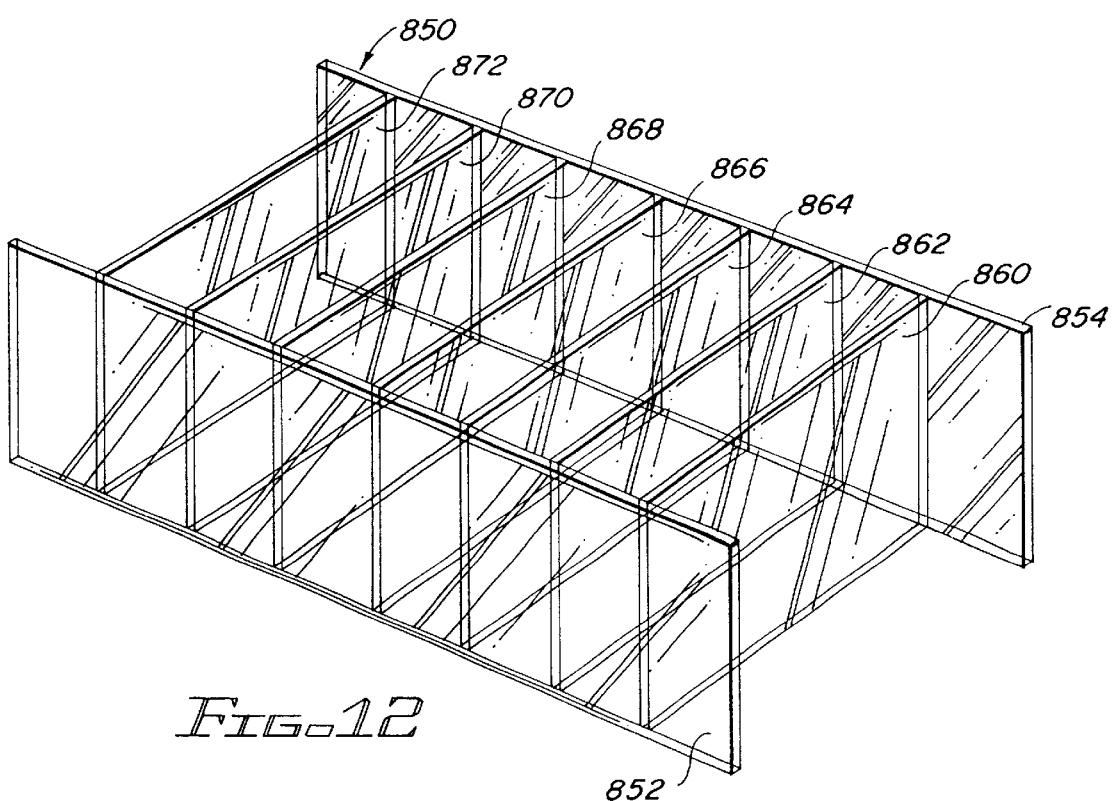
FIG. 12 is a perspective view of an alternate embodiment of a portion of the apparatus of the present invention.
Figure 13:
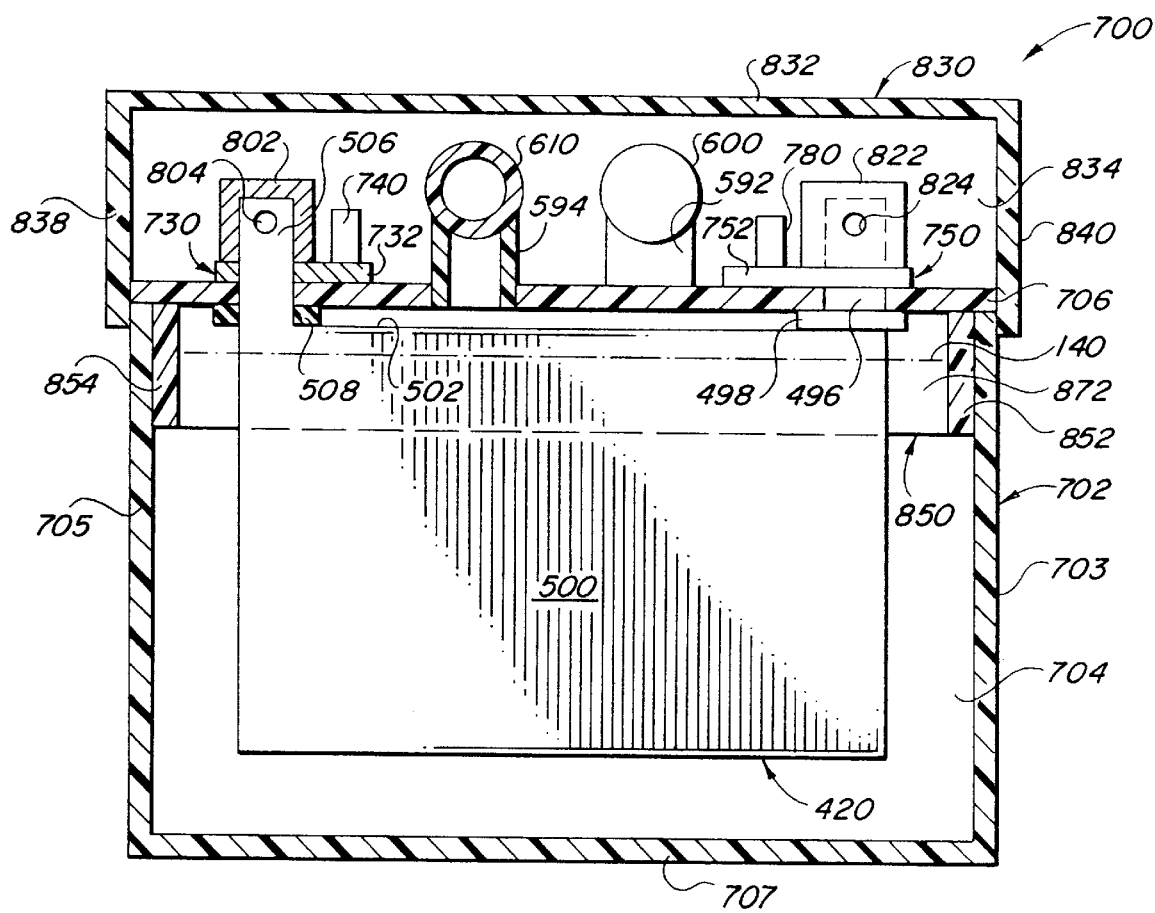
FIG. 13 is an end view in partial section of a hydrogen and oxygen generator apparatus embodying elements illustrated in FIGS. 8, 10, 11, and 12.

A collector assembly 850 is also shown in FIG. 10. The collector assembly 850 is also shown in FIG. 12 and is discussed in detail in conjunction therewith. The collector assembly 850 is also shown in FIG. 13. The collector assembly 850 is shown in partial section from two different points of reference in FIGS. 10 and 13. The assembly 850 is shown in perspective in FIG. 12.

It will be noted that the conduits and manifolds associated with the collector assembly 850 and the plate assembly 420 and through which the generated gas flows have been omitted from FIG. 10 for purposes of clarity. Some of those elements are illustrated in FIG. 13 and similar structure is also shown in FIGS. 7 and 9. Again, such elements have been omitted for purposes of clarity.

Also, as indicated above, a conductive element, such as the element 750, will also be utilized for electrically connecting the plates 440, 460, 480, and their upwardly extending arms, including a post, the electrical connector, etc. Such conductive element is illustrated in FIG. 13 and will be discussed below in conjunction therewith.

FIG. 12 comprises a perspective view of the alternate embodiment collector assembly 850. The collector assembly 850 is also illustrated in FIGS. 10 and 13, and reference will be made to those Figs. as well as to FIG. 12 for the following discussion.

The collector assembly 850 includes a pair of spaced apart walls 852 and 854. Seven divider panels 860, 862, 864, 866, 868, 870, and 872 extend between and are appropriately secured to the wall panels 852 and 854. The outer ends of the walls 852 and 854 extend into slots in the end walls of a housing to support the collector assembly in a housing. In FIG. 10, one end of the wall 854 is shown disposed in a slot in the end wall 704 of the housing 702.

The collector assembly 850 extends downwardly from a top plate of a housing and covers the upper portion of an eight plate assembly, such as the plate assembly 420 of FIG. 8. The panels and the walls 852 and 854 divide the assembly 850 into eight of collector cells, or one collector cell for each electrode palate in the plate assembly 420 of FIGS. 10 and 13. The end walls of the housing 702 comprise the end walls for the outer two collector cells.

The assembly 850 is preferably injection molded. The assembly 850 is, of course, made of appropriate nonconductive material impervious to the chemicals and chemical reactions involved in the generation of the hydrogen and oxygen gases.

FIG. 13 is a view in partial section of the apparatus 700 of FIG. 10, and specifically an end view with the end wall opposite to the wall 704 of FIG. 10 removed, illustrating some of the various elements involved in the apparatus 700 from a different point of reference from that shown in FIG. 10. The collector assembly 850 is shown within the housing 702, extending downwardly from the top wall 706 of the housing 702.

The housing 702 includes a pair of side walls 703 and 705, and a bottom wall 707. The end wall 704 is also shown in FIG. 13. The side walls 852 and 854 extend into slots in the end wall 704, as shown in FIG. 10 for the side wall 854, and into aligned slots in the opposite end wall, not shown.

On the upper surface of the top wall 706 are two conductive elements, the conductive element 750, discussed above, and a conductive element 730. The element 730 is substantially identical to the element 750, except that the element 730 is the mirror image of the element 750. The element 730 includes a strip 732 and a plurality of ears or arms extend outwardly from the strip 730 for electrically contacting the upwardly extending arms of the plates of the electrode plate assembly 420.

Of the electrode assembly 420, a plate 500 is shown, with its arm 506 extending upwardly through an aperture in the top wall 706, and extending through an aperture in an ear or arm of the conductive strip 732 of the conductive element 730. A seal or gasket 508 is shown disposed about the arm 506 between the top wall 706 and the top edge 502. The post 740 is shown extending upwardly from the strip 732.

A cap 802 is shown disposed over the arm 506, and a pin 804 is shown extending through both the arm 506 and the cap 802. The cap 802 provides electrical contact with both the arm 506 and the arm portion of the conductive element 750 through the ear portion of the conductive element 750 through which the arm 506 extends. The post 780 is shown extending upwardly from the strip 752 of the conductive element 750.

An arm 496 of the plate 490 is also shown extending through a slot in the top wall 706. A seal or gasket 498 is shown disposed about the arm 496 at the top wall 706.

A cap 822 is shown disposed over the upper portion of the arm 496, and a pin 824 is shown extending through both the cap 822 and the arm 496. The cap 822 is thus in electrical contact with both the arm 496 and the ear of the connective element 750 through which the arm 496 extends.

Of the collector assembly 850, the walls 852 and 854 are shown in FIG. 13, and a panel 872 is shown extending between the walls 852 and 854, and downwardly from the top wall 706.

The conduit 594 is shown extending upwardly above the plate 500 and through the top wall 706. The conduit 594 extends to the header 610. The conduit 592 is shown extending to the header 600. The hydrogen gas generated at the plate 500 will accordingly flow through the conduit 594 into the header 610, and the oxygen generated at the plate 490, whose arm 496 is shown in FIG. 13, will flow through the conduit 592 and into the header 600.

The space between the bottom of the plate 500 (and, of course, the other plates in the assembly 420) and the bottom wall 707 provides ample clearance for any sediment that falls to the bottom wall 707. The clearance prevents, or at least minimizes, the likelihood of sediment building up on the bottom 707 and shorting out the plates in the assembly 420.

The level of the water (and electrolyte), is shown in dashed line and is indicated by reference numeral 140. It will be noted that the water level 140 is well above the bottom of the collector assembly 850.

The cap 830 is shown disposed over the headers 600 and 610 and the electrical elements, all of which are disposed on the top wall 706. The top 832 end wall 834, side wall 838 are shown in FIG. 13, and also a second side wall 840. The cap 830 comprises a cover, as indicated above, for the housing 702 and the elements disposed on the top plate 706.

Figure 15:
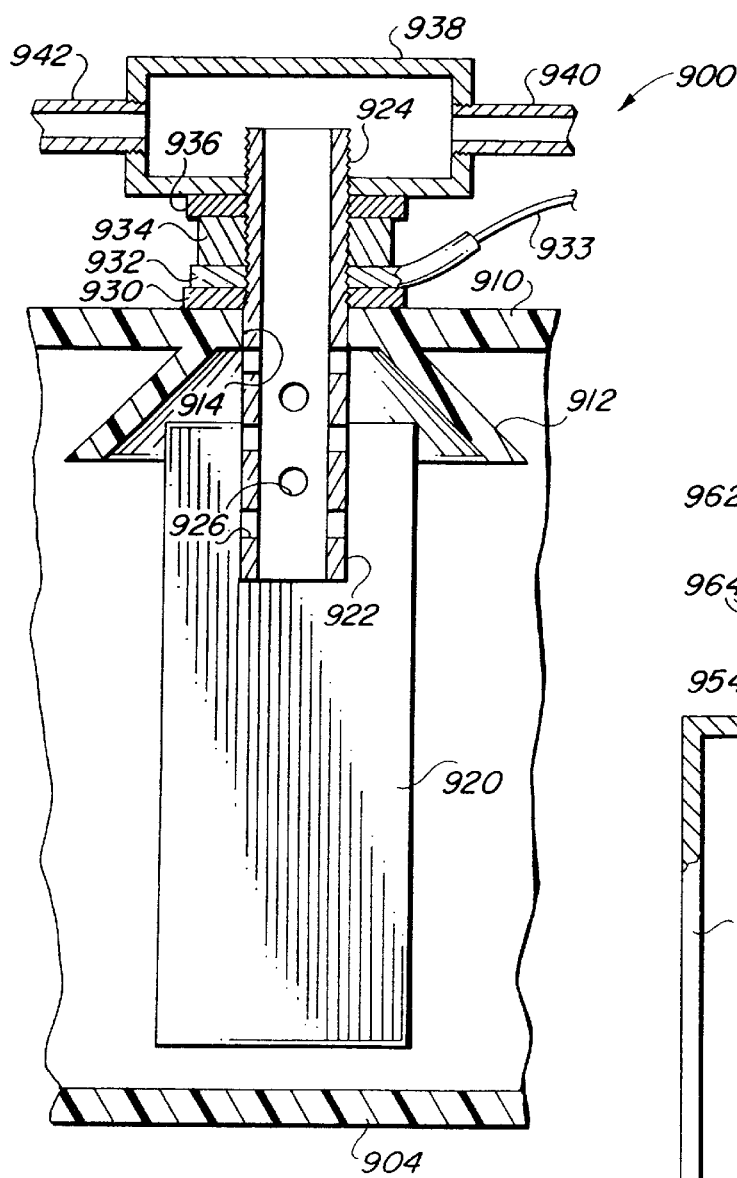
FIG. 15 is a side view in partial section of another embodiment of the apparatus of the present invention.

FIG. 15 comprises a fragmentary view in partial section of an alternate view in partial section of an alternate embodiment 900 of the apparatus of the present invention. The apparatus 900 includes a flat plate electrode 920, as opposed to the other electrode elements discussed above in conjunction with the various embodiments.

The apparatus 900 includes a housing, including a bottom plate 904, and a top plate or cover 910. Extending downwardly and outwardly from the housing top or cover 910 is an integral collector cone 912. Centrally disposed within the collector cone 912 is an aperture 914. Extending through the aperture 914 is a pipe 922. The pipe 922 is appropriately secured, as by welding, to the plate 920. Extending through the pipe 922 are apertures 926 through which generated gas flows into the pipe 922 and upwardly therethrough. The pipe 922 and the plate 920 are preferably made of titanium, etc. or some other appropriate corrosive resistant metal.

At the upper or top part of the pipe 922 is a threaded portion 924. The threaded portion 924 matingly engages the internal threads of a collector element 938. Between the collector element 938 and the top plate or cover 910 is a washer or gasket 930, a electrical connector 932 from which extends a connector 933, and a nut 934. Above the nut 934, and bearing against the bottom of the collector 938, is another washer or gasket 936. Extending outwardly from the collector 938 are connector tubing elements 940 and 942.

In operation, gas, either hydrogen or oxygen, depending on the polarity of the electrical connector 932, is generated at the plate 920 and at the pipe 922. The generated or liberated gas flows upwardly, and into the pipe 924 through the aperture 926 and upwardly into the collector 938. The gas then flows through either the conduit 940 or the conduit 942, depending on the direction of flow, and to ultimately, the intake manifold of an engine. The apparatus 900 essentially works the same as discussed above, although the structure is different. The use of the relatively flat plate 920 may be advantageous when the space available for a hydrogen and oxygen generating apparatus is relatively narrow but rather long.

Figure 16:
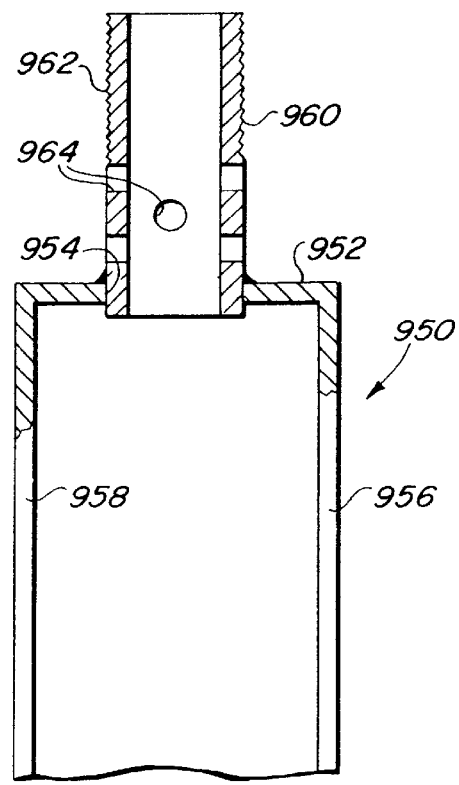
FIG. 16 is a side view of an alternate embodiment of a portion of the apparatus of FIG. 15.

An alternate embodiment of the plate 920 is illustrated in FIG. 16. FIG. 16 comprises a side view in partial section of an alternate electrode assembly 950, which includes essentially an inverted "U" shaped element.

The electrode assembly 950 includes a base 952 through which extends an aperture 954. Extending downwardly from the outer ends of the base 952 are a pair of arms 956 and 958. Extending through the aperture 954, and appropriately welded to the base 952, is the lower or bottom end of a pipe 960. The upper part of the pipe 960 includes a portion 962. The portion 962 makes contact with an appropriate collector for the gas generated by the electrode assembly 950.

A plurality of apertures 964 extend through the pipe 960. The gases then flow upwardly in the inside of the pipe 960. The bottom end of the pipe 960 is open, and gases generated or forming on the interior of the arms 956 and 958, and the bottom of the arm 952, will flow upwardly into the pipe 960 through the open bottom end.

The electrode apparatus 950 may also be used when the space available for a hydrogen and oxygen generating apparatus is relatively long and relatively narrow. The height (or length) of the arms 956 and 958, and their width, may, of course, vary, depending on the surface area desired. It will be noted that the surface area on which the gas is generated is substantially greater for the electrode 950 than for the plate 920 and its pipe.

Two embodiments of collector assemblies are illustrated in FIG. 9 and in FIGS. 10, 12, and 13. In FIG. 9, the collector assembly 550 is shown with a top 552 and a plurality of panels extending downwardly from the top 552 and between a pair of side walls or panels, of which the panel or wall 574 is shown. The assembly 550 extends downwardly from the top wall 404 of the housing 402 in FIG. 9.

In FIGS. 10, 12, and 13, the collector assembly 850 is shown. The collector assembly includes only a pair of walls 852 and 854 with a plurality of panels extending between the walls. The assembly 850 abuts the top wall 706 of the housing 702 in FIG. 10.

Figure 14:
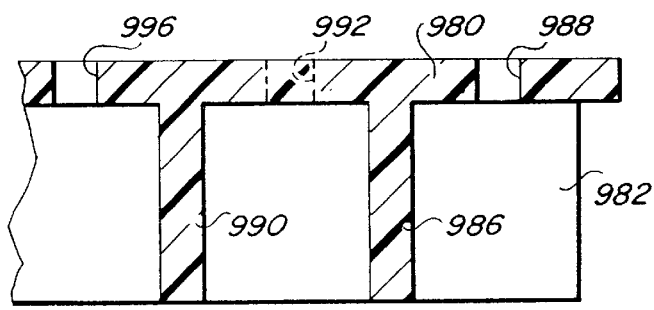
FIG. 14 is a fragmentary view in partial section of another alternate embodiment of a portion of the apparatus of the present invention.

A third embodiment of a collector assembly is shown in FIG. 14. FIG. 14 is a fragmentary view of a portion of a top wall 980, showing the collector assembly as an integral part of the top wall. A side wall 982 and two divider panels 986 and 990 of the collector assembly are shown extending downwardly from the top wall 980 and outwardly from the wall 982 to a second side wall, not shown. Apertures for receiving conduits for collecting gases generated at plates extend through the top wall 980 between the divider panels. An aperture 988 extends between the panel 986 and the wall (not shown) of the housing on which the top wall is disposed, as, for example, the end wall 704 of the housing 702 of FIG. 10 and FIG. 13. An aperture 992 is shown in dashed line between the panels 986 and 990. An aperture 996 is shown between the panel 990 and its next adjacent panel, not shown.

Each of the three embodiments has its own advantages and disadvantages. A collector assembly is used in conjunction with a relatively large system, such as when a plate assembly is used. A collector assembly is, of course, not needed when electrodes, such as shown in FIGS. 2, 3, 4, 5, 6, 14, and 15 are used.

The selection of a particular electrode type depends primarily on the quantity of hydrogen and oxygen desired. The quantity, in turn, depends on the size of engine involved. Moreover, space limitations and electrical needs are also considerations.

In all of the embodiments discussed herein, the two gases are kept separated from each other and are collected separately. The gases are also conveyed to the intake manifold separately, and accordingly are not mingled until they flow to the respective cylinders of the engine in the vehicle in which they are secured, as discussed above.

This separate collection cell system in which the gases are collected separately and maintained separately offers substantial safety considerations over hydrogen and oxygen generator apparatus in which the gases are collected together and are transported together.

Electrolytes for the electrolysis reactions in generating hydrogen and oxygen are well known and understood in the art. Typically, acids may be used or bases, such as sodium hydroxide or potassium hydroxide, etc. Depending on the current densities required, or desired, either a basic electrolyte solution or an acidic electrolyte solution may be used.

For electrodes, as stated, an appropriate metal will be used. For most applications, titanium may be most suitable. Stainless steel or other metals or alloys may be suitable for other applications.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. For example, while the present apparatus has been discussed in terms of a vehicle and an engine in the vehicle, it is obvious that the apparatus may also be used in conjunction with a stationary engine. The appended claims are intended to cover and embrace any and all such modifications, within the limits only of the true spirit and scope of the invention.

What We claim is:

1. Hydrogen and oxygen generating apparatus for an internal combustion engine having an intake manifold and fuel injection unit and an electrical system including an ignition circuit, comprising in combination:

housing means, including a case for holding a quantity of water;

a quantity of water in the case;

cathode means secured to the case and disposed in the quantity of water in the case;

anode means secured to the case and disposed in the quantity of water in the case and spaced apart from the cathode means;

electric current means connected to the cathode means and the anode means for generating hydrogen and oxygen at the cathode means and anode means, respectively;

first conduit means extending from the anode means to the intake manifold for transporting oxygen generated at the anode means to the intake manifold; and second conduit means extending from the cathode means to the fuel injection unit for transporting hydrogen generated at the cathode to the fuel injection unit, whereby the oxygen and the hydrogen flow separately to the internal combustion engine.

2. The apparatus of claim 1 which further includes an electrolyte in the quantity of water.

3. The apparatus of claim 1 which the electric current means is connected to the electrical system of the vehicle through the ignition circuit to insure that oxygen and hydrogen are generated only when the ignition circuit is energized.

4. The apparatus of claim 3 in which the electric current means includes means for sensing the water level in the case and a switch for disconnecting the electric current to the anode and cathode when the water level in the housing drops below a predetermined level.

5. The apparatus of claim 3 in which the electric current means includes means for sensing a flow of air in the intake manifold and switch means for disconnecting the electric current to the anode and cathode in response to the cessation of the flow of air in the intake manifold.

6. The apparatus of claim 3 in which the electrical current means further includes an ammeter for measuring the flow of electric current between the anode and the cathode.

7. The apparatus of claim 1 which further includes a reservoir for holding a replenishing supply of water for the case.

8. The apparatus of claim 7 in which the housing means further includes a water conduit extending between the reservoir and the case through which replenishing water flows from the reservoir to the case.

9. The apparatus of claim 8 in which the housing means further includes means for sensing the level of the water in the case and valve means for controlling the flow of replenishing water in the water conduit.

10. The apparatus of claim 1 in which the anode and the cathode each comprise a plurality of plates spaced apart from each other and interleaved in the case.

11. The apparatus of claim 10 in which the first conduit means includes first collection means for collecting the oxygen generated at each plate of the plurality of anode plates and a first conduit extending from the first connection means to the intake manifold through which the oxygen flows.

12. The apparatus of claim 11 in which the second conduit means includes second collection means for collecting the hydrogen generated at each plate of the plurality of cathode plates and a second conduit extending from the second collection means to the fuel injection unit through which the hydrogen flows.

13. The apparatus of claim 12 in which the first collection means comprises a first plurality of separator chambers with a chamber disposed above each plate of the first pluralities of plates for collecting the generated oxygen, and a first manifold connected to the first plurality of separator chambers, and the first conduit is connected to the first manifold.

14. The apparatus of claim 13 in which the second collection means comprises a second plurality of collection chambers disposed above the second plurality of plates for collecting the generated hydrogen, and a second manifold connected to the second plurality of chambers, and the second conduit is connected to the second manifold.

15. The apparatus of claim 14 in which the first and second collection chambers extend respectively about at least a portion of the first and second pluralities of plates and into the water in the case to prevent the generated oxygen and hydrogen from mixing in the case.

16. The apparatus of claim 10 in which the housing means further includes a top for supporting the pluralities of anode and cathode plates in the case.

17. The apparatus of claim 16 in which the housing means further includes a cap disposed above the top and enclosing at least a portion of the electric current means, the first conduit means, and the second conduit means.

18. The apparatus of claim 1 in which the anode means and the cathode means each include a pipe, and a plurality of apertures extend through each pipe.

19. The apparatus of claim 18 in which the anode means and the cathode means further include a square tube disposed about each pipe, and a plurality of apertures extends through each tube.

20. The apparatus of claim 19 in which each pipe is in electrical contact with its tube, and the plurality of apertures in the tubes are aligned with the apertures in the pipes.

21. The apparatus of claim 20 in which the anode means and the cathode means further include a zinc bar secured to and disposed against each tube.

22. The apparatus of claim 18 in which the anode means and the cathode means each include a plate secured to a pipe.

23. The apparatus of claim 22 in which each pipe includes a plurality of apertures extending through the pipe through which water and electrolyte and the generated gas flows.

24. The apparatus of claim 22 which further includes a collector cone disposed about at least a portion of each plate and pipe for insuring that the generated gases are directed to the pipe.

25. The apparatus of claim 22 which further includes a collector connected to each pipe through which the generated gases flow from the pipe.

26. In a nonconductive housing, apparatus for generating hydrogen and oxygen gases in at least a pair of cells from water and an electrolyte when an electric current is passed between the cells comprising in combination:
   a first cell, including
      a first pipe defining a first electrode,
      a plurality of apertures extending through the first pipe through which the water and electrolyte flows,
      a first collector disposed about a portion of the first pipe for collecting gas generated in the first cell, and
      an open top on the first pipe through which gas generated at the first pipe flows out of the first cell;
   a second cell, including
      a second pipe defining a second electrode,
      a plurality of apertures extending through the second pipe through which water and electrolyte flows,
      a second collector disposed about a portion of the second pipe for collecting gas generated in the second cell, and
      an open top in the second pipe through which the gas generated at the second pipe flows out of the second cell;
   means for providing an electrical current between the first and second electrodes to generate oxygen and hydrogen gases in the cells;
   a first conduit connected to the first collector through which gas flows from the first cell; and
   a second conduit connected to the second collector through which gas flows from the second cell, whereby the generated gases are collected separately and flow separately outwardly from the housing.

27. The apparatus of claim 26 in which the first collector and the second collector are made of nonconductive material.

28. The apparatus of claim 26 which further includes conductive sleeves disposed about and secured to the first and second pipes.

29. The apparatus of claim 28 in which the conductive sleeves include a plurality of apertures extending through them and through which the water and electrolyte flows.

30. The apparatus of claim 26 in which the first and second collectors further include first and second skirts secured to the first and second collectors, respectively, to insure that the generated gases flow upwardly into the pipes.

31. A method of generating oxygen and hydrogen for an internal combustion engine comprising the steps of:
   providing a housing;
   providing a quantity of water in the housing;
   providing an anode electrode and a cathode electrode in the quantity of water;
   connecting the anode and cathode electrodes to an appropriate source of electrical current;
   collecting oxygen gas and hydrogen gas separately at the respective electrodes; and
   routing the collected gases separately to the internal combustion engine namely routing the collected oxygen to an intake manifold and the collected hydrogen to a fuel injector.

32. The method of claim 31 which further includes the step of connecting the source of electrical current through the ignition system of the engine for connecting the source of electrical current to the electrodes only when the ignition system is "on."

33. The method of claim 32 which further includes the steps of providing a sensor in the intake manifold to sense the flow of air in the intake manifold, and providing a switch responsive to the flow of air for connecting the source of electrical current to the electrodes only when air is flowing in the intake manifold.

34. The method of claim 31 in which the steps of providing an anode electrode and a cathode electrode includes the steps of providing a plurality of plates for the respective anode and cathode electrodes.

35. The method of claim 34 which further includes the step of interleaving the respective anode and cathode plates.

36. The method of claim 35 which further includes the step of providing a collector cell for each anode and cathode plate.

37. The method of claim 31 in which the step of providing anode and cathode electrodes includes the step of providing a pipe for each electrode.

38. The method of claim 37 which further includes the step of providing a plurality of apertures in each pipe.

39. The method of claim 38 which further includes the step of providing square tubing about the pipes.

* * * * *